United States Patent
Ariga

(10) Patent No.: US 7,502,550 B2
(45) Date of Patent: Mar. 10, 2009

(54) WATERPROOF CAMERA CASE FOR CONTAINING CAMERA EQUIPPED WITH LENS BARRIER

(75) Inventor: Kazuto Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 11/264,639

(22) Filed: Nov. 1, 2005

(65) Prior Publication Data
US 2006/0110146 A1 May 25, 2006

(30) Foreign Application Priority Data
Nov. 22, 2004 (JP) ............... 2004-337078

(51) Int. Cl.
*G03B 17/08* (2006.01)
(52) U.S. Cl. .......... 396/27; 348/376
(58) Field of Classification Search ............ 396/27, 396/25, 29, 535, 26, 28, 448; 348/81, 89, 348/72, 373–376
See application file for complete search history.

(56) References Cited

U.S. PATENT DOCUMENTS 5,608,478 A * 3/1997 Kamoda ............... 396/503
7,050,712 B2 * 5/2006 Shimamura ............... 396/27
2005/0281552 A1 * 12/2005 Konishi et al. ............. 396/301

FOREIGN PATENT DOCUMENTS

| JP | 09-179185 A | 7/1997 |
|---|---|---|
| JP | 2000-131803 A | 5/2000 |

OTHER PUBLICATIONS

The above references were cited in a Jan. 18, 2008 Chinese Office Action issued in the counterpart Chinese Patent Application 200510124183.9. Comments on JP2000-131803 which were prepared as part of response to the Chinese Office Action dated Jan. 18, 2008 are attached.

* cited by examiner

Primary Examiner—W. B. Perkey
Assistant Examiner—David M. Schindler
(74) Attorney, Agent, or Firm—Cowan, Liebowitz & Latman, P.C.

(57) ABSTRACT

A camera case capable of stopping a movement of the lens barrier provided on a camera if the camera receives an accidental shock. The camera case can contain a camera having an image-taking lens, and a lens barrier movable between a closed position for covering the image-taking lens and an opened position for exposing the image-taking lens. The camera case comprises a case body; and a stopper which stops the movement of the lens barrier of the camera contained in the case body.

5 Claims, 4 Drawing Sheets

PRIOR ART

WATERPROOF CAMERA CASE FOR CONTAINING CAMERA EQUIPPED WITH LENS BARRIER

FIELD OF THE INVENTION

The present invention relates to camera cases used for taking images underwater with cameras.

BACKGROUND OF THE INVENTION

A waterproof camera in which a film unit with a lens is contained in a waterproof case has been used (see Japanese Patent Laid-Open Application No. 2000-194048). This waterproof camera includes a function required for image-taking and has a waterproof transparent plastic case for enabling underwater image-taking.

This kind of camera is an integrated waterproof camera in which the case cannot be opened and closed by a user. Therefore condensation on the inner surface of the case, especially on the lens surface, by a water temperature change considerably affects the image-taking.

The waterproof camera disclosed in Japanese Patent Laid-Open Application No. 2000-194048 has a dehumidifying means inside of the case.

A waterproof case having divided front and rear cases which can be opened and closed has been proposed. This waterproof case makes it easy to wipe away water drops created by condensation.

There have been digital cameras equipped with a lens barrier slidable between a closed position for covering the image-taking lens and an opened position for exposing the lens. FIGS. 7 and 8 show a conventional waterproof case having a transparent housing for containing such a digital camera.

FIGS. 7 and 8 are front and top views of the conventional waterproof case, respectively. 101 denotes the waterproof case which can contain a digital camera 201. The waterproof case 101 comprises front and rear case 102 and 103 which are made of transparent polycarbonate (PC), hinges 104 connecting the front case 102 with the rear case 103 openably and closably, an unillustrated packing which is fitted in an unillustrated groove formed on the matching portion of the front and rear cases 102 and 103, and a clip 105 for fixing the closed front and rear cases 102 and 103.

The front case 102 has a lens window 106, and a shutter button 107 and a zoom lever 108 as operation members. The rear case 103 has an operation button unit 109 including operation members. These operation members are connected to respective operation buttons provided on the digital camera 201 when the digital camera 201 is set inside of the case 101, thereby making it possible to operate the digital camera underwater in the same manner as the digital camera 201 not contained in the case 101.

Inside the waterproof case 101, the digital camera 201 is fixed by an unillustrated rib provided on the waterproof case 101 so that the image-taking optical axis of the digital camera 201 may be substantially matched to the center of the lens window 106. The digital camera 201 has a lens barrel 202 holding an image-taking lens, and a lens barrier 203 is provided on the camera body. The lens barrier 203 is slidable between the above-described closed and opened positions.

In FIG. 7, the camera 201 is powered on, and the lens barrier 203 is opened for enabling image-taking.

However, when the waterproof case 101 that has been set in the state showing in FIG. 7 receives a shock, there is a possibility that the lens barrier 203 will move in the direction to the closed position from the opened position. For example, the possibility occurs in a case where a scuba diver holding the waterproof case 101, which has been set in the state showing in FIG. 7 on the boat, dives into the sea.

Then, the detection of the movement of the lens barrier 203 in the direction to the closed position by a lens barrier position detection means provided in the digital camera 201 causes the lens barrel 202 to collapse into the camera body automatically. In other words, image-taking with the camera 201 becomes impossible.

As a result, the user has to resurface once, open the case 101, operate the lens barrier 203 to the opened position to set the digital camera 201 in an image-taking state, and then close the case 101.

In contrast, in a case where the waterproof case 101 is used as a carrying case, the user can carry the case 101 containing the digital camera 201 in which the lens barrier 203 has been moved to the closed position. Thereby, it is possible to prevent the camera 201 from contacting obstacles directly to protect the camera 201.

However, the movement, which is caused by a shock on the waterproof case 101, of the lens barrier 203 in the direction to the opened position from the closed position causes the digital camera to power on. Thereby, the electric power is wasted until the camera 201 is powered off (the lens barrier 203 is returned to the closed position) by the user or the camera 201 comes into a sleep state automatically.

BRIEF SUMMARY OF THE INVENTION

One object of the present invention is to provide a camera case assuredly capable of stopping a movement of a lens barrier equipped with a camera if the camera receives an accidental shock.

The camera case that is an aspect of the present invention can contain a camera having an image-taking lens, and a lens barrier movable between a closed position for covering the image-taking lens and an opened position for exposing the image-taking lens. The camera case comprises a case body; and a stopper which stops the movement of the lens barrier of the camera contained in the case body.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiments of the present invention by referring to the accompanying drawings.

Embodiment 1

Figure 1:
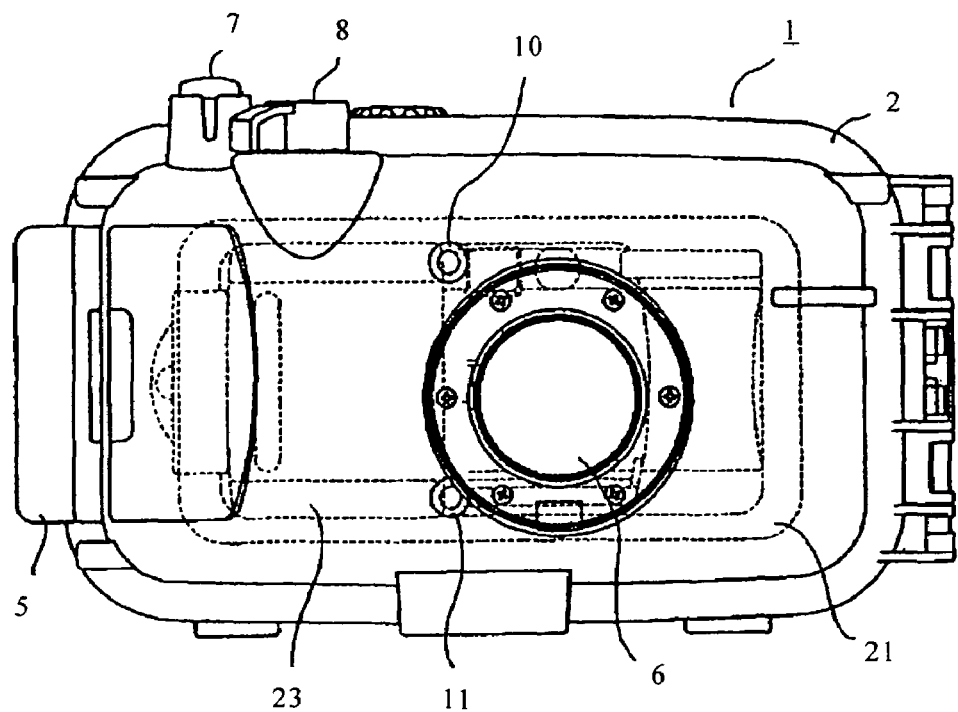
FIG. 1 is a front view showing the camera case that is Embodiment 1 of the present invention.
Figure 2:
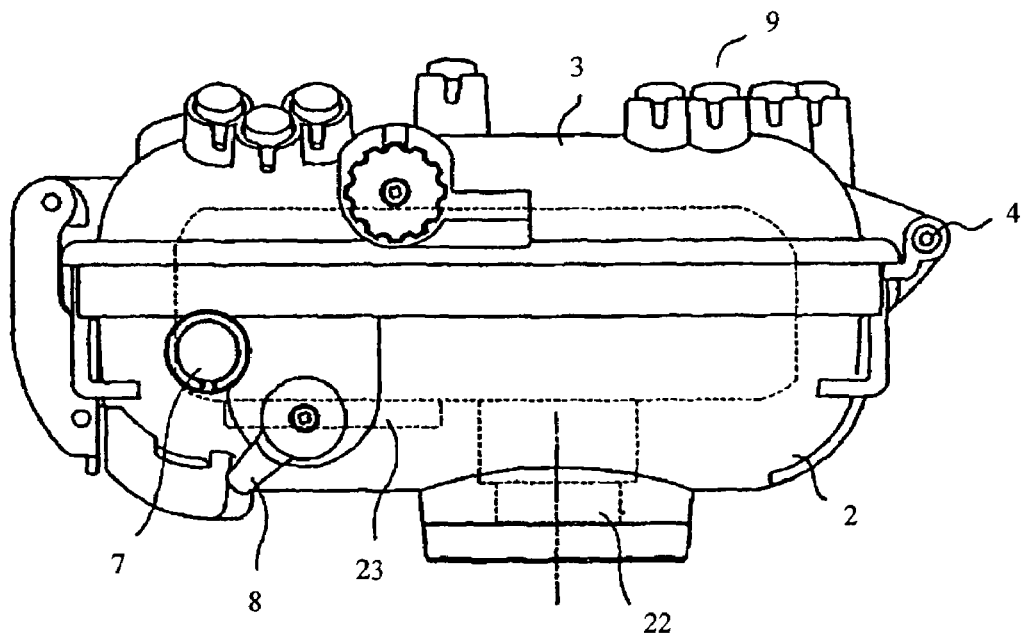
FIG. 2 is a top view showing the camera case of Embodiment 1.

FIGS. 1 and 2 are front and top schematic views showing the structure of a waterproof case (camera case) for a digital camera, the waterproof case being Embodiment 1 of the present invention.

1 denotes a case body containing a digital camera 21. The case body 1 is made of transparent polycarbonate (PC), and constituted by a front case 2 and a rear case 3 that is attached to the front case 2. The case 2 is connected to the rear case 3 openably and closably by hinges 4. An unillustrated packing is fitted in an unillustrated groove formed on the matching portion of the front and rear cases 2 and 3. A clip 5 for fixing the closed front and rear cases 2 and 3 is provided on the case body 1.

The front case 2 has a lens window 6, and a shutter button 7 and a zoom lever 8 as operation members. The rear case 3 has an operation button unit 9 including operation members. These operation members are connected to respective operation buttons provided on the digital camera 21 when the digital camera 21 is contained inside of the case body 1, thereby making it possible to operate the digital camera 21 underwater. In other words, it is possible to construct an image-taking system which can take images underwater.

Inside the waterproof case, a rib 1a for fixing the digital camera 21 to the case body 1 is provided (see FIG. 3) Thereby, it is possible to fix the digital camera 21 in the case body 1 so that the image-taking optical axis of the digital camera 21 may be substantially matched to the center of the lens window 106.

The digital camera 21 has a lens barrel 22 holding an image-taking lens. The lens barrel 22 can project from and collapse into the camera body. A slidable lens barrier 23 for protecting the front face of the image-taking lens in the non-image-taking state (collapsed state) is provided on the camera body. The lens barrier 23 is slidable along the front face of the camera body between a closed position for covering the front face of the collapsed lens barrel 22 and an opened position for opening (exposing) the front face of the lens barrel 22 to enable the lens barrel 22 to project.

In the image-taking state shown in FIG. 1, the lens barrier 23 is located at the opened position. Stopper mechanisms 10 and 11, described later, are provided on the front case 2 at two positions in the vertical direction.

Figure 3:
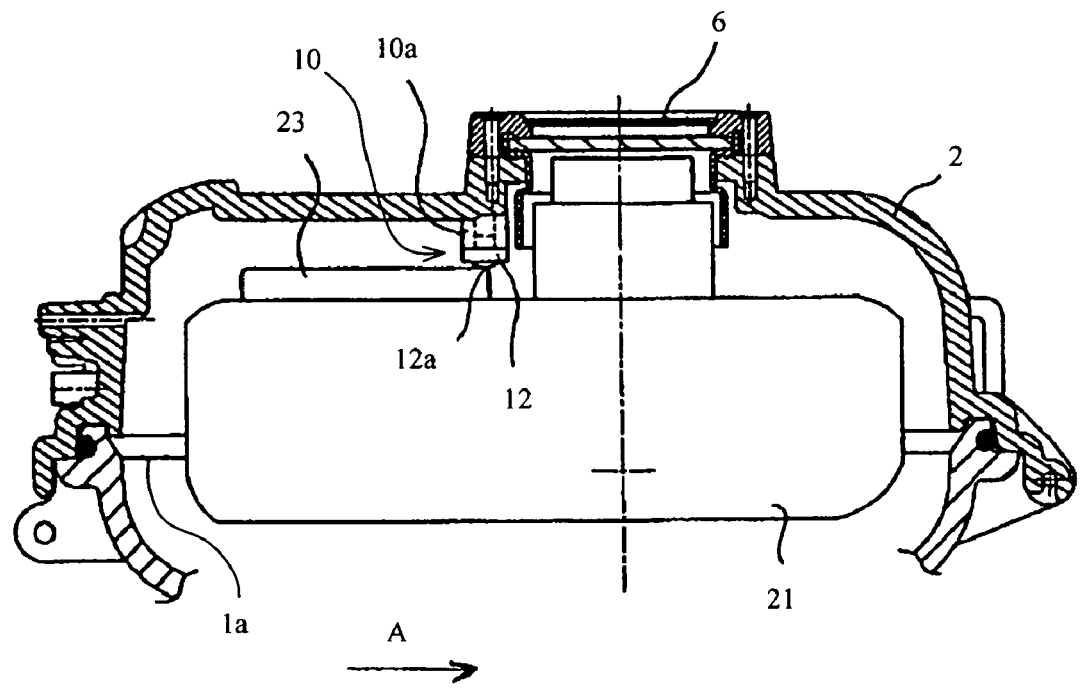
FIGS. 3 and 4 are sectional views showing the camera case of Embodiment 1.
Figure 4:
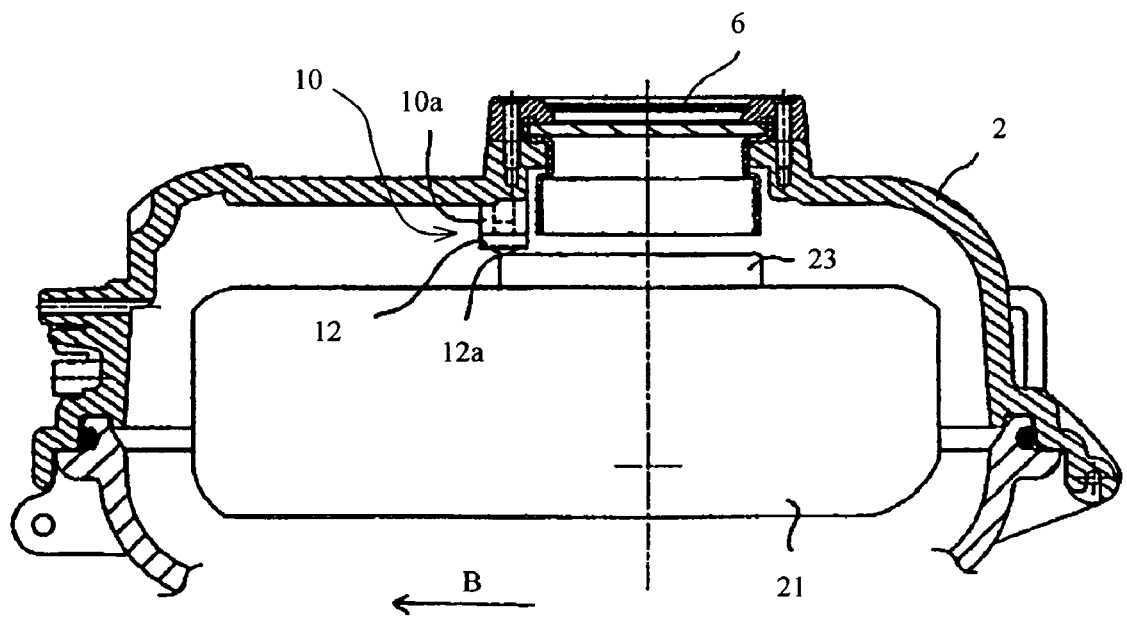

FIGS. 3 and 4 are sectional views of the waterproof case containing the digital camera when viewed from the bottom, the sectional views showing a horizontal section including the image-taking optical axis. FIG. 3 shows a state in which the lens barrier 23 is located at the opened position, and FIG. 4 shows a state in which the lens barrier 23 is located at the closed position. The configuration on the rear case 3 is omitted in FIGS. 3 and 4.

The stopper mechanism 10 is constituted by a stopper holding portion 10a having a pipe shape and formed integrally with the front case 2, and a stopper 12 pushed into and fixed to the stopper holding portion 10a. The stopper 12 is made of an elastic material. A hemispheric protrusion 12a is formed on the tip of the stopper 12. The protrusion 12a pushes the lens barrier 23 located at the opened and closed positions to the camera body in the image-taking optical axis direction, as shown in FIGS. 3 and 4, respectively. The configuration of the stopper mechanism 11 is similar to that of the stopper mechanism 10, including a stopper holding portion 10a and a stopper 12, not shown in the figure.

These two stopper mechanisms 10 and 11 prevent the lens barrier 23 from sliding in the closing and opening directions shown by the arrow A in FIG. 3 and the arrow B in FIG. 4, respectively, when the waterproof case containing the digital camera 21 receives a shock.

As described above, according to the present invention, the stoppers 12 made of the elastic material contact the front face of the lens barrier 23 located at the opened and closed positions with pressure. Therefore, it is possible to prevent the lens barrier 23 of the digital camera 21 set in the waterproof case from moving when the waterproof case receives a shock.

Embodiment 2

Figure 5:
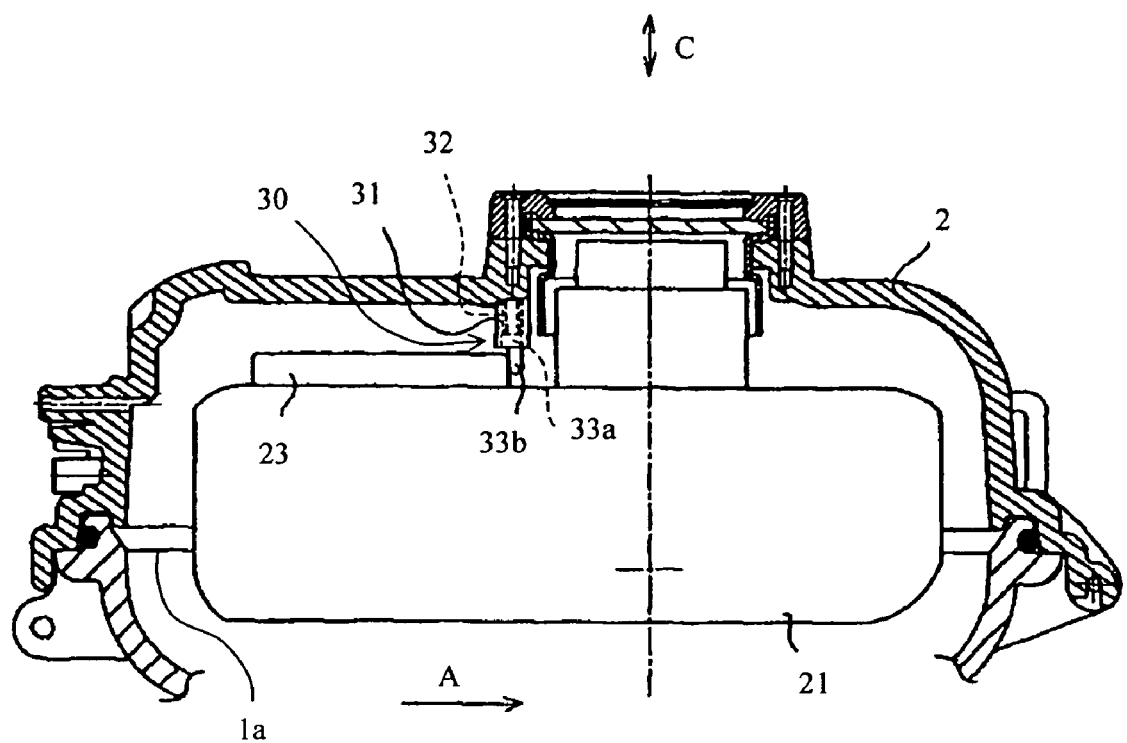
FIGS. 5 and 6 are sectional views showing the camera case that is Embodiment 1 of the present invention.
Figure 6:
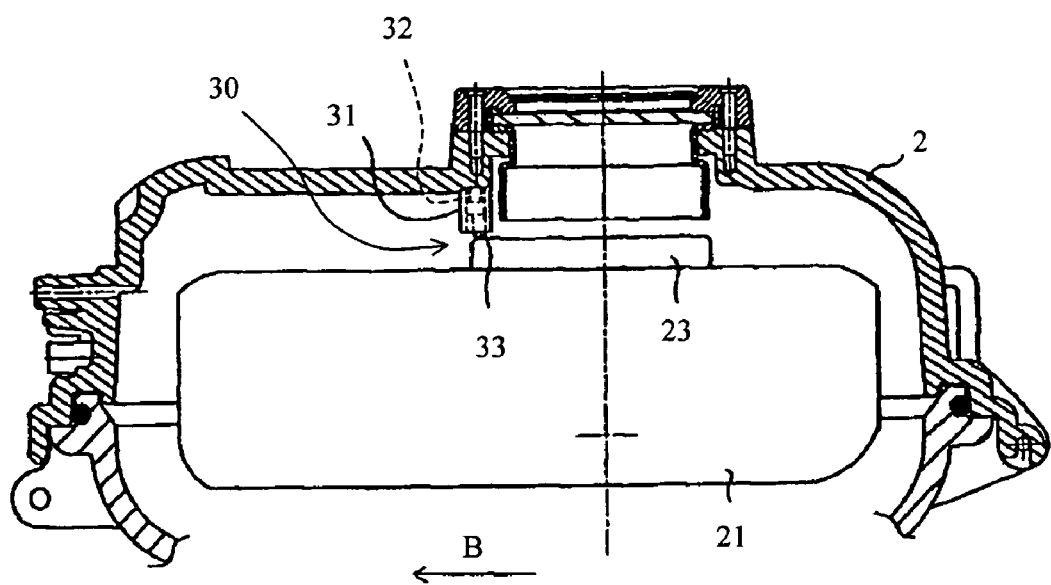
Figure 7:
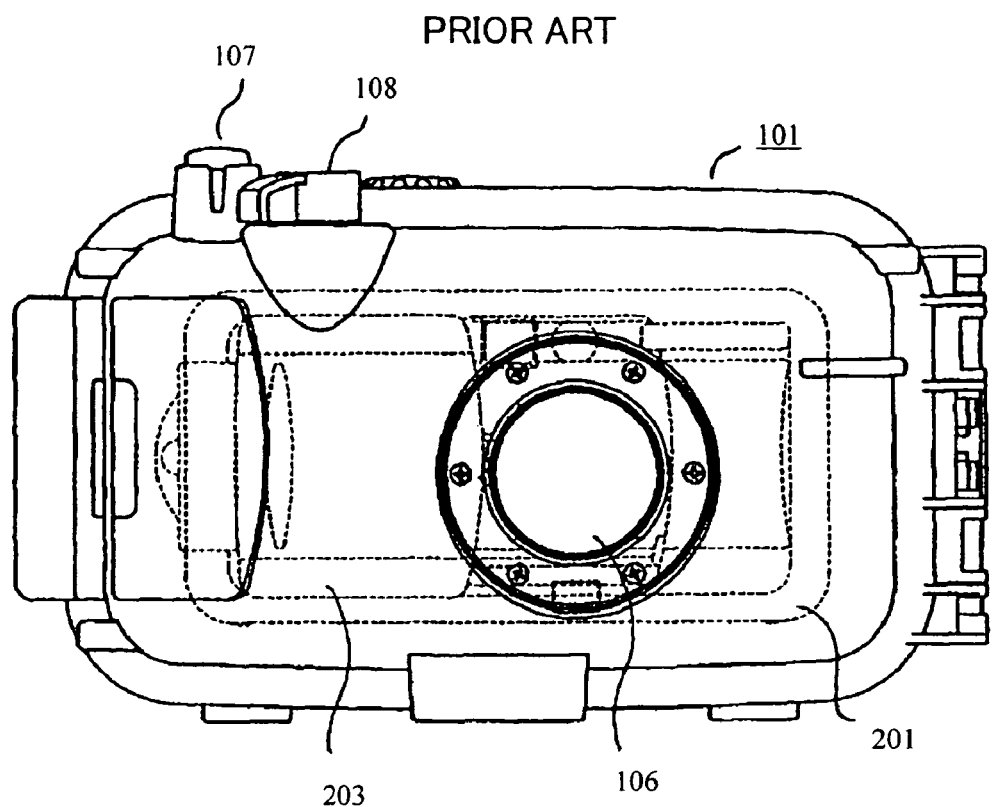
FIG. 7 is a front view showing a conventional camera case.
Figure 8:
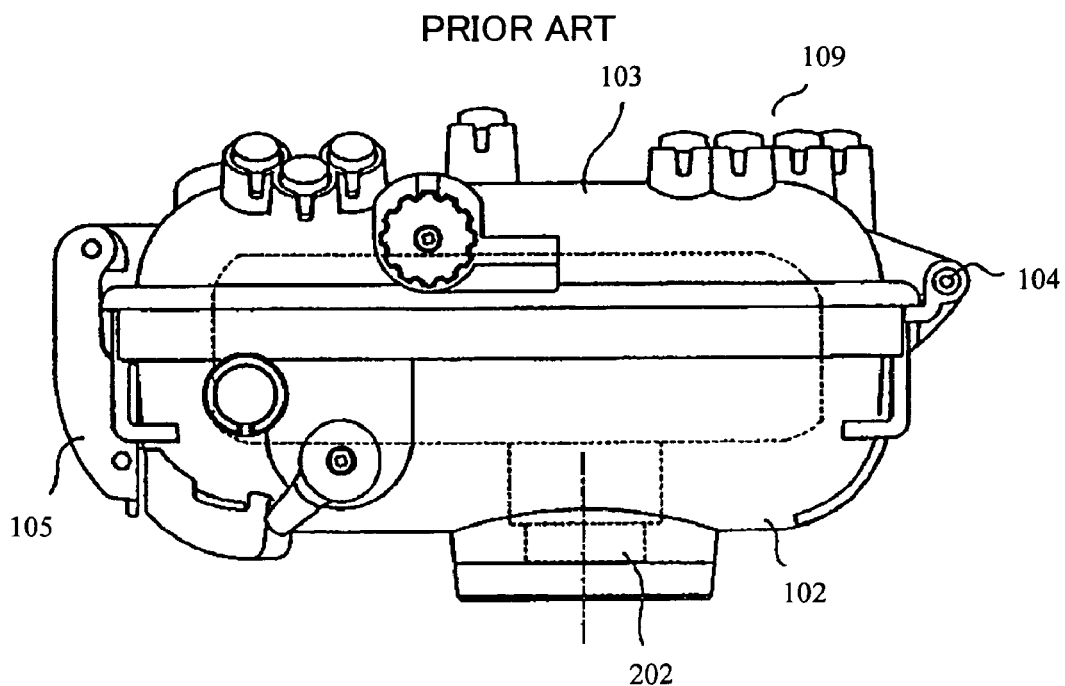
FIG. 8 is a top view showing the conventional camera case.

FIGS. 5 and 6 are schematic views showing the structure of a waterproof case (camera case) for a digital camera, the camera case being Embodiment 1 of the present invention. FIGS. 5 and 6 are sectional views of the waterproof case containing the digital camera when viewed from the bottom, the sectional views showing a horizontal section including the image-taking optical axis. FIG. 5 shows a state in which the lens barrier 23 is located at the opened position, and FIG. 6 shows a state in which the lens barrier 23 is located at the closed position. The configuration on the rear case 3 is omitted in FIGS. 5 and 6.

Components identical to those in Embodiment 1 are designated with the same reference numerals as those in Embodiment 1.

In the present embodiment, stopper mechanisms 30 are provided on the front case 2 at two positions in the vertical direction.

The stopper mechanism 30 is constituted by a stopper holding portion 31 having a pipe shape and formed integrally with the front case 2, and a stopper 33 inserted into the stopper holding portion 31, and a spring 32 which is contained in the stopper holding portion 31 and whose one end contacts the stopper 33. The spring 32 biases the stopper 33 toward the front face of the camera 21 as shown by the arrow C.

The stopper 33 has a base portion 33a where the one end of the spring 32 contacts, and a barrier pushing portion 33b whose center is shifted from the base portion 33a in the closing direction of the lens barrier 23. The tip of the barrier pushing portion 33b has a hemispheric shape.

As shown in FIG. 5, when the lens barrier 23 is located at the opened position, the barrier pushing portion 33b of the stopper 33 is protruded to a position adjacent to the side face of the lens barrier 23 by the biasing force of the spring 32. Thereby, the movement of the lens barrier 23 in the closing direction is stopped.

As shown in FIG. 6, when the lens barrier 23 is located at the closed position, the tip of the barrier pushing portion 33b of the stopper 33 contacts the front face of the lens barrier 23 with pressure by the biasing force of the spring 32. Thereby, the movement of the lens barrier 23 in the opening direction is stopped.

In Embodiment 1 described above, since the stopper 12 is made of an elastic material, the pressured contact force (that is, a force to stop the movement of the lens barrier 23) changes according to the size of the digital camera 21 or the stopper 12. However, in the present embodiment, since the stopper 33 is biased by the spring 32, it is possible to stop the movement of the lens barrier 23 stably if the size of the digital camera 21 or the stopper 12 is different in some degree.

In the above-described embodiments, the stopper contacts the lens barrier to stop the movement thereof. However, the present invention is not limited thereto. For example, the camera case of the present invention may have a magnet as a stopper which magnetically attracts a lens barrier made of metal.

This application claims foreign priority benefits based on Japanese Patent Application No. 2004-337078, filed on Nov. 22, 2004, which is hereby incorporated by reference herein in its entirety as if fully set forth herein.

What is claimed is:

1. A camera case for containing a camera that includes an image-taking lens and a lens barrier movable between a closed position to cover the image-taking lens and an opened position to expose the image-taking lens, the camera case comprising:

a front case including a lens window that faces that image taking lens when the camera is contained in the camera case, the front case being provided with a stopper that contacts the lens barrier; and a rear case openable and closable with respect to the front case, wherein the stopper stops a movement of the lens barrier to the opened position when the camera with the lens barrier located at the closed position is contained in the camera case and the rear case is closed with respect to the front case, and the stopper stops a movement of the lens barrier to the closed position when the camera with the lens barrier located at the opened position is contained in the camera case and the rear case is closed with respect to the front case.

2. The camera case according to claim 1, wherein a stopper holding portion is formed integrally with the front case, and the stopper is held by the stopper holding portion.

3. The camera case according to claim 2, wherein the stopper holding portion has a pipe shape, and the stopper is pressed into the stopper holding portion, and wherein the stopper made of an elastic material contacts the lens barrier when the camera is contained in the camera case.

4. The camera case according to claim 2, wherein the stopper holding portion has a pipe shape, and the stopper is inserted into the stopper holding portion with a spring, and wherein the stopper biased by the spring contacts the lens barrier when the camera is contained in the camera case.

5. The camera case according to claim 4, wherein the stopper contacts a side face of the lens barrier when the camera with the lens barrier located at the opened position is contained in the camera case, and the stopper contacts a front face of the lens barrier when the camera with the lens barrier located at the closed position is contained in the camera case.

* * * * *